United States Patent [19]

Murata et al.

[11] Patent Number: 5,437,942
[45] Date of Patent: Aug. 1, 1995

[54] LITHIUM SECONDARY BATTERY

[75] Inventors: Kazuo Murata; Youetsu Yoshihisa; Kazunari Takeda; Syuichi Izuchi, all of Takatsuki, Japan

[73] Assignee: Yuasa Corporation, Osaka, Japan

[21] Appl. No.: 39,431

[22] PCT Filed: Aug. 18, 1992

[86] PCT No.: PCT/JP92/01043

§ 371 Date: Apr. 20, 1993

§ 102(e) Date: Apr. 20, 1993

[87] PCT Pub. No.: WO93/04509

PCT Pub. Date: Apr. 3, 1993

[30] Foreign Application Priority Data

Aug. 21, 1991 [JP] Japan .................................. 3-235364

[51] Int. Cl.⁶ .............................................. H01M 6/18
[52] U.S. Cl. ................................................ 429/192
[58] Field of Search ........................ 429/191, 192, 193

[56] References Cited

U.S. PATENT DOCUMENTS 5,059,497 10/1991 Prince et al. ..................... 429/193
5,173,205 12/1992 Marchese et al. ............. 429/192 X
5,219,682 6/1993 Bones et al. ...................... 429/193

FOREIGN PATENT DOCUMENTS

| | | |
|---|---|---|
| 59-173977 | 10/1984 | Japan . |
| 62-296375 | 12/1987 | Japan . |
| 63-40270 | 2/1988 | Japan . |
| 63-141271 | 6/1988 | Japan . |
| 63-289767 | 11/1988 | Japan . |
| 1107479 | 4/1989 | Japan . |
| 1186767 | 7/1989 | Japan . |
| 91/15035 | 10/1991 | WIPO . |

OTHER PUBLICATIONS

Patent Abstracts of Japan, vol. 13, No. 117 (E-731)(3465) 22 Mar. 1989 and JP 63-289767.
Patent Abstracts of Japan, vol. 13, No. 481 (E-838)(3829) 31 Oct. 1989 and JP 1-189872.
Patent Abstracts of Japan, vol. 17, No. 019 (E-1306) 13 Jan. 1993 and JP 4-248275.

Primary Examiner—John S. Maples
Attorney, Agent, or Firm—Evenson, McKeown, Edwards & Lenahan

[57] ABSTRACT

A lithium secondary battery includes a positive electrode, an electrolyte layer having a solid polymer electrolyte, and a negative electrode using metallic lithium or lithium alloy as an active material. The electrolyte layer includes a first layer and a second layer, and an electrolyte of the first layer in contact with the negative electrode is less reactive with a negative active material than to an electrolyte of the second layer.

3 Claims, 2 Drawing Sheets

LITHIUM SECONDARY BATTERY

TECHNICAL FIELD

This invention relates to a lithium secondary battery using a solid polymer electrolyte.

BACKGROUND ART

With a recent development of micro-electronics, demands for minimizing a size, a weight and a thickness of a battery and a demand for increasing an energy density of it have been increasing.

A lithium secondary battery, which uses metallic lithium or lithium alloy as its negative active material, has become the object of public attention for its high energy density, and a lithium secondary battery using an liquid electrolyte is now put to practical use. However, the liquid electrolyte is apt to cause a solution-leakage to the outside of the battery and an elution or volatilization etc. of electrode material. For this reason, there have been problems, in the lithium secondary batteries, of worse long-term reliability and poor safety due to flying-around of electrolyte solution during a sealing process.

Study and development of the lithium secondary battery using the solid polymer electrolyte have been carried on actively in recent years. This battery has such advantages that it is provided with a solution-leakage resistance and does not produce an elution or volatilization etc. of electrode material because it uses the solid polymer electrolyte in addition to its feature of high energy density. Namely, the lithium secondary battery using the solid polymer electrolyte has a high energy density and is excellent in safety and long-term reliability.

However, the above-mentioned lithium secondary battery using the solid polymer electrolyte has included the following problems.

(1) Lithium forming a negative active material grows into a branched shape on a surface of negative electrode at time of charging, i.e. a dendrite of lithium has been formed, so that an internal short-circuiting has been produced due to contact of it with a positive electrode or the lithium has deposited into a mossy shape to cause a falling-off of lithium. As the result, the charge/discharge cycle life is extremely shortened. The formation of dendrites is caused by the fact that the lithium turns into ions at the time of discharging and is eluted to make the negative electrode surface into a corrugated shape and that the lithium deposites on convex portions in a concentrated manner at time of charging after the discharging. The deposited lithium has a high activity because it is composed of fine particles including large surface areas, so that it reacts with the organic electrolyte solution and dissolves the electrolytic solution to deteriorate the electrolyte so as to shorten the charge/discharge cycle life. In order to cope with this problem, the use of lithium alloy as the negative electrode is well known (Published Patent Application (KOKAI) No. 52-5423, for example). However, the strength of the lithium alloy is small as represented by lithium-aluminum alloy, so that cracking or breaking into fine particles may sometime occur due to repeated charging and discharging operations. Therefore, the charge/discharge cycle life has not heretofore been improved satisfactorily.

(2) The solid polymer electrolyte generally used so far is a high-molecular compound obtained by polymerizing a polyether which has included no functional group at an end of a principal chain and included an ionic salt, so that its electric conductivity has been small. Therefore, in the conventional lithium secondary battery, there has been a problem in that it has been hard to obtain a discharge performance to an extent durable for practical use. To cope with this disadvantage, a solvent serving as a plasticizer has been added to the solid polymer electrolyte. When the solvent is added, an electric conductivity of the solid polymer electrolyte can be improved but its strength is weakened. When the strength is weakened, the solid polymer electrolyte is apt to be damaged so as to cause an internal short-circuiting etc. In the solid polymer electrolyte added with solvent, the formation of dendrites of lithium becomes larger than that with no solvent, and a pressure applied to the assembled element specially required for the positive electrode side can not be obtained because of a low resiliency as compared with the solid polymer electrolyte added with no solvent, so that there has been a problem of short charge/discharge cycle life.

An object of this invention is to provide a lithium secondary battery which has a high energy density, is excellent in safety and long-term reliability, and has a strength and charge/discharge cycle life durable for practical use.

DISCLOSURE OF THE INVENTION (1) This invention provides a lithium secondary battery comprising a positive electrode, an electrolyte layer composing of a solid polymer electrolyte, and a negative electrode using metallic lithium or lithium alloy as an active material, characterized by that the electrolyte layer comprises at least two layers in which one layer in contact with the negative electrode is composed of an electrolyte hard to react with the negative active material and the other layer is composed of an electrolyte easy to react with the negative active material.

Lithium-aluminum, lithium-lead, lithium-tin, lithium-aluminum-tin, lithium-gallium alloys and Wood's alloy, for example, are used as the lithium alloy but the kind of lithium alloy is not limited to these materials. They are used independently or several kinds of them are mixed.

In this invention, the formation of dendrites of lithium in the negative electrode is restrained by the above one layer, and a large electric conductivity is maintained and the growth of dendrites is restrained by the above other layer.

(2) The other layer of the disclosure (1) is so devised that this layer is easy to react with the negative active material because it includes a solvent, and the one layer of the disclosure (1) is so devised that this layer is hard to react with the negative active material because it includes a small content of solvent as compared with that of the other layer or it does not include the solvent at all.

As the solvent; cyclic carbonic ester such as propylene carbonate and ethylene carbonate etc., cyclic ester such as γ-butyrolactone, tetrahydrofuran or its derivatives, ethers such as 1,3-dioxane, 1,2-dimethoxyethane and methyldigraim, etc., nitriles such as acetonitrile and benzonitrile etc., dioxorane or its derivatives etc., sulfolane or its derivetives, for example, are used. However, the kind of solvent is not limited to these materials.

They are used independently or several kinds of them are mixed. Compounding ratio and compounding methods are at will.

(3) The electrolyte of the one layer in the disclosure (1) is a high-molecular compound which is formed by polymerizing a polyether and does not have the functional group at the end of a principal chain but includes an ionic salt. The electrolyte of the other layer in the disclosure (1) is a high-molecular compound which is formed by polymerizing a polyether, has the functional group at the end of a principal chain and includes an ionic salt.

As the polyether; diethylene glycol, polyethylene glycol, polypropylene glycol, copolymer of ethylene oxide with propylene oxide, and copolymer of glycerol with ethylene oxide or propylene oxide etc., for example, are used. The above polyether has a hydroxyl group forming the functional group. Further, [1] the above polyether is used under a state where the hydroxyl group is ester combined with acrylic acid for example, when the polyether is used as a material for the electrolyte of the one layer, and [2] the polyether is used under a state where it includes the hydroxyl group when the polyether is used as a material for the electrolyte of the other layer. When plural kinds of polyethers are used as a material for the electrolyte of the other layer, it is sufficient that at least one kind of them has a functional hydroxyl group. As the other polyethers; esters diacrylate such as diethylene glycol and triethylene glycol etc. and ester diacrylate such as hydroquinone for example, may be used.

As the ionic salt; inorganic ionic salts including one kind of Li, Na or K such as $LiClO_4$, $LiSCN$, $LiBF_4$, $LiAsF_6$, $LiCF_3SO_3$, $LiCF_3CO_2$, $NaI$, $NaSCN$, $NaBr$ and $KSCN$ etc., quarternary ammonium salts such as $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate and $(C_2H_5)_4N$-phthalate etc., and organic ionic salts such as lithium stearyl sulfonate, sodium octyl sulfonate, and lithium dodecylbenzene sulfonate etc., for example, are used. Two or more kinds of them may be used in a combined manner.

(4) The electrolyte of one layer in the disclosure (1) is the same as that in the disclosure (3), and the electrolyte of the other layer of the disclosure (1) is composed of an electrolyte in which a material reactive with the negative active material is added to the electrolyte of the one layer.

As the material reactive with the negative active material; $\beta$-$Al_2O_3$ is preferably used, but inorganic compounds having a hydroxyl group or phosphoric group and organic compounds having an active hydrogen group may be used. The kind of material is not limited to these materials.

BEST MODE FOR CARRYING OUT THE INVENTION

Embodiments of this invention will be described hereunder with reference to the drawings.

(Embodiment 1)

Figure 1:
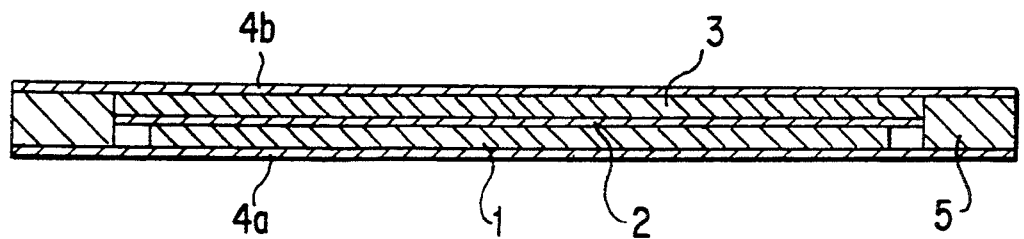
FIG. 1 is a vertical sectional view showing a lithium secondary battery according to an embodiment 1 of this invention.

FIG. 1 is a vertical sectional view showing a film-type lithium secondary battery of this embodiment 1. 1 denotes a negative electrode, 2 denotes an electrolyte layer, 3 denotes a positive electrode, 4a denotes a negative current collector, 4b denotes a positive current collector, and the current collectors 4a and 4b serve also as an exterior package. 5 denote a sealing member. Metallic lithium is used as an active material for the negative electrode 1. The electrolyte layer 2 is made of a film-shaped solid polymer electrolyte. The solid polymer electrolyte is a copolymer of ethylene oxide with propylene oxide, and includes lithium perchlorate. The positive electrode 3 comprises a mixture of $TiS_2$ serving as an active material, carbon black serving as a conductive agent and a solid polymer electrolyte that is the same as above. Incidentally, the positive electrode 3 is formed in such a way that the ethylene oxide and propylene oxide, which are materials the of the solid polymer electrolyte, are mixed with the active material and the conductive agent, and they are then applied onto the current collector 4 so as to be polymerized. The current collectors 4a and 4b are made of metallic foil and stainless steel, for example, is used therefor. The sealing member 5 is made of a heat-bonding resin and denatured polypropylene, for example, is used therefor. Iron, nickel and copper etc. may be used as the negative current collector 4a, and aluminum, titanium and copper etc. may be used as the positive current collector 4b.

Figure 2:
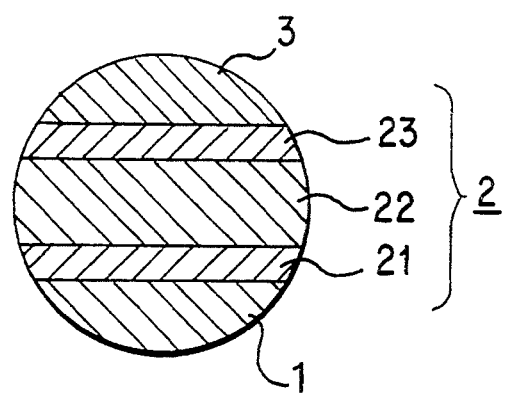
FIG. 2 is an enlarged sectional view of an essential part of the lithium secondary battery according to the embodiment 1.

The electrolyte layer 2 has a triple-layer structure comprising a first layer 21 in contact with the negative electrode 1, an intermediate second layer 22 and a third layer 23 in contact with the positive electrode 3 as shown in FIG. 2. The electrolyte of the second layer 22 includes a solvent of 20 to 60 wt %, and the electrolytes of the first layer 21 and the third layer 23 do not include the solvent at all or include a small quantity of the solvent as compared with that of the second layer 22. Polypropylene carbonate, for example, is used as the solvent.

(Embodiment 2)

Figure 3:
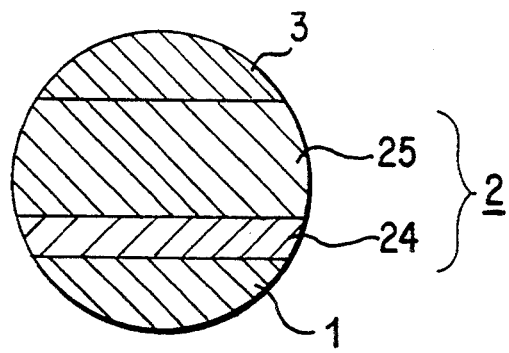
FIG. 3 is an enlarged sectional view of an essential part of a lithium secondary battery according to an embodiment 2 of this invention.

FIG. 3 is an enlarged sectional view of an essential part of a lithium secondary battery of this embodiment 2, and is a view corresponding to FIG. 2. In this battery, the electrolyte layer 2 has a double-layer structure comprising a first layer 24 in contact with the negative electrode 1 and a second layer 25 in contact with the positive electrode 3, and other components are the same as those of the embodiment 1.

(Comparison Example 1)

Figure 4:
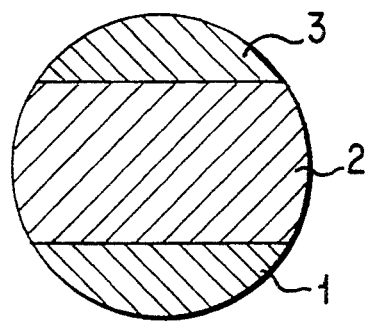
FIG. 4 is an enlarged sectional view of an essential part of a lithium secondary battery according to a comparison example 1.

FIG. 4 is an enlarged sectional view of an essential part of a lithium secondary battery of this comparison example 1, and is a view corresponding to FIG. 2. In this battery, the electrolyte layer 2 has a single-layer structure including the solvent, and other components are the same as those of the embodiment 1.

(Comparison Example 2)

A lithium secondary battery of this comparison example 2 has the same structure as that of the battery of comparison example 1 except that the lithium secondary battery does not include the solvent.

The following performance tests were carried out using the batteries of embodiment 1 & 2 and comparison examples 1 & 2.

(1) Initial Discharge Performance Test

The batteries of embodiment 1 & 2 and comparison examples 1 & 2 were discharged with 10 hour-rates at ordinary temperature. The batteries of embodiments 1 & 2 and comparison example 1 developed the rated discharge capacity, but the battery of comparison example 2 developed only a capacity of 30% thereof.

(2) Charge/discharge Cycle Performance Test

The charge/discharge cycle performance test was carried out with 10 hour-rates using the batteries of embodiments 1 & 2 and comparison example 1. The batteries of embodiments 1 & 2 did not present a decrease in capacity even after being subjected to charge and discharge operations of 100 cycles, but the battery of comparison example 1 presented a decrease in capacity down to about a half of the initial capacity after being subjected to charge and discharge operations of 100 cycles.

(3) Pressure-resistance Test

A pressure of 5 kg/cm$^2$ was applied onto the batteries of embodiment 1 & 2 and comparison examples 1 & 2. The batteries of embodiment 1 & 2 and comparison example 2 did not develop any abnormality but the battery of comparison example 1 produced an internal short-circuiting assumed to be attributable to a damage of the electrolyte layer 2.

As seen from the above tests, the batteries of embodiments 1 & 2 have strengths and charge/discharge cycle lives of suitable durability for practical use, and their initial charge/discharge performances are excellent.

In the battery of embodiment 1, the electrolyte of the first layer 21 in contact with the negative electrode 1 does not include the solvent at all or includes only a small quantity of solvent as compared with that of the second layer 22. For this reason, the first layer 21 is hard to react with the lithium forming the negative active material. Accordingly, the formation of dendrite of lithium in the negative electrode 1 is restrained by the first layer 21. The first layer 21 has a large strength and resiliency, so does the third layer 23. While, the electrolyte of the second layer 22 includes a solvent of 20 to 60 wt %. For this reason, the second layer 22 has a large electric conductivity but its strength is small. Even if the second layer 22 has a small strength, since the first layer 21 and the third layer 23 have large strengths and resiliencies, a strength of the entire electrolyte layer 2 becomes large and the pressure applied to the positive electrode and negative electrode can be set large. Namely, the strength of the battery of embodiment 1 becomes suitable for practical use. Further, the second layer 22 has a large electric conductivity so that it is easy to react with the lithium forming the negative active material. For this reason, even when the dendrite is formed, its growth is restrained by the second layer 22. The electric conductivity of the entire electrolyte layer 2 becomes large because the second layer 22 has a large electric conductivity. The formation and growth of dendrites are restrained and the entire electrolyte layer 2 has a large electric conductivity, so that the charge/discharge cycle life of the battery of embodiment 1 becomes durable for practical use. The features described above are also applicable to the battery of embodiment 2.

Moreover, the batteries of embodiments 1 & 2 have such features that they are provided with the solution-leakage resistance and the elution or volatilization etc. of electrode material do not occur because the solid electrolyte is used therefor. Accordingly, they are excellent in safety and long-term reliability. In addition, the metallic lithium is used as the negative active material so that they also have a high energy density.

As described above, the lithium secondary batteries of embodiments 1 & 2 have the high energy density, are excellent in the safety and long-term reliability, and have the strength and charge/discharge cycle life durability suitable for practical use.

Incidentally, the negative active material for use in the batteries of embodiments 1 & 2 may be lithium alloy, and the used solvent is not limited to the propylene carbonate.

(Embodiment 3)

Figure 5:
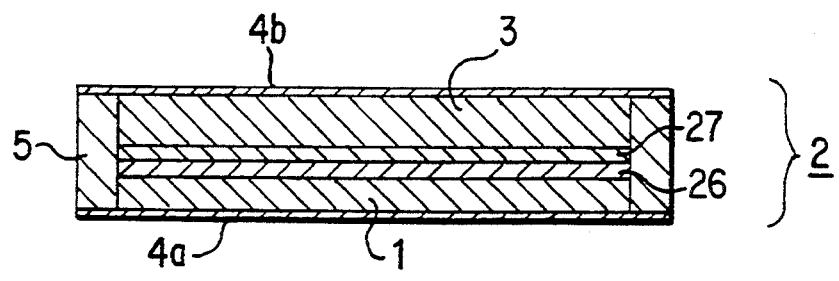
FIG. 5 is a vertical sectional view showing a lithium secondary battery according to an embodiment 3 of this invention.

FIG. 5 is a vertical sectional view showing a lithium secondary battery of this embodiment 3. In the figure, components that are the same or similar to those of FIG. 1 are attached with the same symbols. The positive electrode 3 is composed of a mixture of an active material, a conductive agent and a binder. The electrolyte layer 2 has a double-layer structure comprising a first layer 26 in contact with the negative electrode 1 and a second layer 27 in contact with the positive electrode 3.

The above battery thus constructed was made up according to the following procedures.

(a) In the first place, the positive electrode 3 was formed on the current collector 4$b$ in the following manner. A mixture A was prepared, which was formed by mixing vanadium pentaoxide serving as the positive active material with acetylene black serving as the conductive agent with a weight percent ratio of 85 to 15. On the other hand, a mixture B was prepared, which was formed by mixing ester diacrylate (molecular weight: 4000) of ethylene oxide with ester monoacrylate (molecular weight: 400) of polyethylene glycol with a weight percent ratio of 7 to 3. 10 parts by weight of the mixture B, 1 part by weight of lithium hexafluoro arsenate, 0.05 part by weight of azobisisobutylonitrile, 10 parts by weight of ethylene carbonate and 10 parts by weight of propylene carbonate were mixed, and this mixture was mixed with the mixture A with a weight percent ratio of 3 to 10 under an atmosphere of dry inert gas. The obtained mixture was cast on the current collector 4$b$ on a surface of which a conductive carbon film was formed, and left as it was for one hour at a temperature of 100° C. under an atmosphere of inert gas so as to be cured. A film thickness of the obtained positive electrode 3 was 60 microns.

(b) In the next place, lithium metal serving as the negative active material was press bonded onto the current collector 4$a$ so as to form the negative electrode 1. The first layer 26 was then formed on the negative electrode 1 in the following manner. 30 parts by weight of the above mixture B, 6 parts by weight of lithium hexafluoro arsenate, 0.05 part by weight of azobisisobutylonitrile, 32 parts by weight of ethylene carbonate and 32 parts by weight of propylene carbonate were mixed, and this mixture was cast on the negative electrode 1 and left as it was for one hour at a temperature of 100° C. under an atmosphere of inert gas so as to be cured. A film thickness of the obtained first layer 26 was 15 microns.

(c) The second layer 27 was formed on the first layer 26 obtained in the procedure (b) in the following manner. 30 parts by weight of polyether triole (molecular weight: 3000) including ethylene oxide unit, 6 parts by weight of lithium hexafluoro arsenate, 32 parts by weight of ethylene carbonate, 32 parts by weight of propylene carbonate, 4 parts by weight of methylene diphenylene diisocyanate and 0.4 part by weight of dibutyltindiacetate were mixed, and this mixture was cast on the first layer 26 and left as it was for one hour at a temperature of 100° C. under an atmosphere of inert gas so as to be cured. A film thickness of the obtained second layer 27 was 15 microns.

(d) The laminate obtained in the procedure (c) was combined with the laminate obtained in the procedure (a) so as to make up a battery shown in FIG. 5.

In this instance, the procedures (b) and (c) may be carried out in advance of the procedure (a).

The materials of mixture B used in the procedure (b), have the ester acrylate at the end of principal chain and do not have the functional group at the end of the principal chain. Therefore, the polymer formed by the mixture B does not have the functional group at the end of principal chain. On the other hand, the polyether used in the procedure (c) has the hydroxyl group at the end of the principal chain. Consequently, the polymer formed by this polyether has the hydroxyl group forming the functional group at the end of the principal chain.

In other words, the electrolyte of the first layer 26 obtained in the procedure (b) is a high-molecular compound obtained by polymerizing the polyether, which does not have the functional group at the end of the principal chain and includes the ionic salt. The electrolyte of the second layer 27 obtained in the procedure (c) is a high-molecular compound obtained by polymerizing the polyether, which has the functional group at the end of the principal chain and includes the ionic salt. Therefore, the electrolyte of the first layer 26 has such a property that it is hard to react with the negative active material, and the electrolyte of the second layer 27 has such a property that it is easy to react with the negative active material.

(Comparison Example 3)

A battery of this comparison example 3 has the same structure as that of the embodiment 3 except that the electrolyte layer 2 is composed only of the first layer 26 of embodiment 3. The film thickness of the electrolyte layer 2 is 30 microns.

(Comparison Example 4)

In a battery of this comparison example 4, the electrolyte layer 2 is composed only of the second layer 27 of embodiment 3. The film thickness of the electrolyte layer 2 is 30 microns.

In this example, the positive electrode 3 was made up in the following manner. The mixture A same as the embodiment 3 was prepared. 10 parts by weight of polyether triole (molecular weight: 3000) including ethylene oxide unit, 1 part by weight of lithium hexafluoro arsenate, 10 parts by weight of ethylene carbonate, 10 parts by weight of propylene carbonate, 1.4 parts by weight of methylene diphenylene diisocyanate and 0.15 part by weight of dibutyltindiacetate were mixed, and this mixture was mixed with the above-mentioned mixture A and treated in the same way as the embodiment 3. The film thickness of the obtained positive electrode 3 was 60 microns.

The other components are the same as those of embodiment 3.

(Embodiment 4)

In a battery of this embodiment 4, the second layer 27 of the electrolyte layer 2 is formed in the following manner, and the other components are the same as those of the embodiment 3. 30 parts by weight of the mixture B of embodiment 3, 6 parts by weight of lithium hexafluoro arsenate, 0.05 part by weight of azobisisobutylonitrile, 32 parts by weight of ethylene carbonate, 32 parts by weight of propylene carbonate and 30 parts by weight of $\beta$-$Al_2O_3$ dried at 100° C. for 12 hours in vacuum were mixed, and this mixture was cast on the first layer 26 and left as it was for one hour at 100° C. under an atmosphere of inert gas so as to be cured. The film thickness of the obtained second layer 27 was 15 microns.

Electrode areas of the battery of the above-mentioned embodiments 3 & 4 and comparison examples 3 & 4 were set to 100 $cm^2$.

Figure 6:
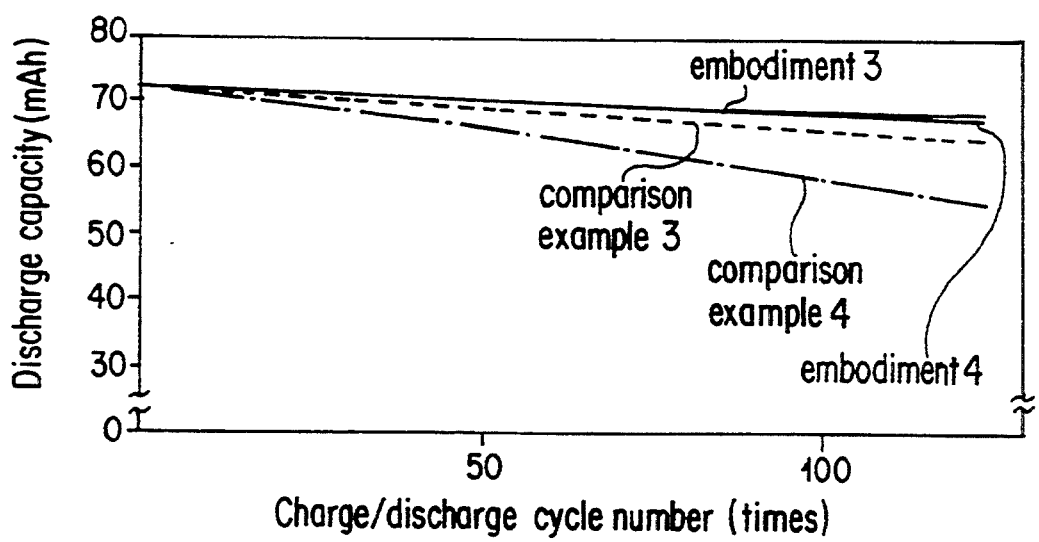
FIG. 6 is a diagram showing results obtained by charge/discharge cycle performance tests using batteries of embodiments 3 & 4 and comparison examples 3 & 4.

Charge/discharge cycle performance tests were carried out using the above-mentioned batteries of embodiments 3 & 4 and comparison examples 3 & 4. Testing conditions were a temperature of 25° C., a constant current of 100 micro-amperes, a charge final voltage of 3.2 V and a discharge final voltage of 2.0 V. FIG. 6 shows a relation between charge/discharge cycle number and discharge capacity.

As seen from FIG. 6, the batteries of embodiments 3 & 4 develop excellent charge/discharge cycle characteristics as compared with the batteries of comparison examples 3 & 4.

As compared with the batteries of embodiments 3 & 4, there were many batteries of comparison examples 3 & 4 which became defective in charge/discharge property due to short-circuiting etc. during the cycle tests. Especially, in the batteries of comparison example 4, eight batteries out of thirty became defective during the tests. A possible cause is that, in the batteries of comparison example 4, a reaction was apt to occur between the lithium serving as the negative active material and the electrolyte so that a passive state layer was formed on a surface of lithium and the defective charge/discharge property was caused by this passive state layer.

In the battery of embodiment 3, the electrolyte of the first layer 26 in contact with the negative electrode 1 is hard to react with the lithium forming the negative active material. Accordingly, the formation of dendrites of lithium in the negative electrode 1 is restrained by the first layer 26. On the other hand, the electrolyte of the second layer 27 is easy to react With the lithium forming the negative active material so that the second layer 27 has a large electric conductivity. Therefore, even when a dendrite is formed, its growth is restrained by the second layer 27. Since the formation and growth of the dendrites is restricted and the electric conductivity of the electrolyte layer 2 is maintained large by the second layer 27, the charge/discharge cycle life of the battery of embodiment 3 becomes durable enough for practical use. The matters described above will also be applicable to the battery of embodiment 4. In this instance, the electrolyte of the second layer 27 in the battery of embodiment 4 includes $\beta$-$Al_2O_3$ which is a compound reactive with the lithium forming the negative active material, so that it is easy to react with the lithium forming the negative active material.

As described above, the lithium secondary batteries of embodiments 3 & 4 have the high energy density, are excellent in safety and long-term reliability, and have a charge/discharge cycle life durable enough for practical use.

Industrial Applicability

A lithium secondary battery of this invention has a high energy density, is excellent in safety and long-term reliability, and has a strength and charge/discharge cycle life durable enough for practical use. Therefore, this battery can satisfy a demand for effecting microelectronics sufficiently so that its industrial value is large.

What is claimed is:

1. A lithium secondary battery comprising:
   a positive electrode,
   an electrolyte layer having a solid polymer electrolyte, and
   a negative electrode using metallic lithium alloy as an active material,
   wherein the electrolyte layer comprises a first layer and a second layer, said first layer having a first electrolyte in contact with the negative electrode, said second layer having a second electrolyte, said first electrolyte being less reactive with a negative active material than said second electrolyte,
   wherein the second layer includes a solvent, and the first layer includes a small amount of solvent as compared to the second layer.

2. A lithium secondary battery comprising:
   a positive electrode,
   an electrolyte layer having a solid polymer electrolyte, and
   a negative electrode using metallic lithium alloy as an active material,
   wherein the electrolyte layer comprises a first layer and a second layer, said first layer having a first electrolyte in contact with the negative electrode, said second layer having a second electrolyte, said first electrolyte being less reactive with a negative active material than said second electrolyte,
   wherein the electrolyte of the first layer is a high-molecular weight compound which has a polyether structure and does not have a functional group at the end of a principal chain but includes an ionic salt, and the electrolyte of the second layer is a high-molecular weight compound which has a polyether structure, has a functional group at the end of a principal chain and includes an ionic salt.

3. A lithium secondary battery comprising:
   a positive electrode,
   an electrolyte layer having a solid polymer electrolyte, and
   a negative electrode using metallic lithium alloy as an active material,
   wherein the electrolyte layer comprises a first layer and a second layer, said first layer having a first electrolyte in contact with the negative electrode, said second layer having a second electrolyte, said first electrolyte being less reactive with a negative active material than said second electrolyte,
   wherein the electrolyte of the first layer is a high-molecular weight compound which has a polyether structure and does not have a functional group at the end of a principal chain but includes an ionic salt, and the electrolyte of the second layer is a high-molecular weight compound which is formed by adding to the high-molecular weight compound of the electrolyte of the first layer a material reactive with the negative active material comprising at least one substance selected from the group consisting of beta-alumina, inorganics containing a hydroxyl group, inorganics containing a phosphoric group and inorganics containing an active hydrogen group.

* * * * *

UNITED STATES PATENT AND TRADEMARK OFFICE
CERTIFICATE OF CORRECTION

PATENT NO. : 5,437,942
DATED : August 1, 1995
INVENTOR(S) : MURATA et al.

It is certified that error appears in the above-indentified patent and that said Letters Patent is hereby corrected as shown below:

On The Title page, item [87], "PCT Pub. Date: Apr. 3, 1993" should read --PCT Pub. Date: March 4, 1993--.

Signed and Sealed this

Tenth Day of October, 1995

Attest:

BRUCE LEHMAN

Attesting Officer

Commissioner of Patents and Trademarks